Patented Mar. 7, 1944

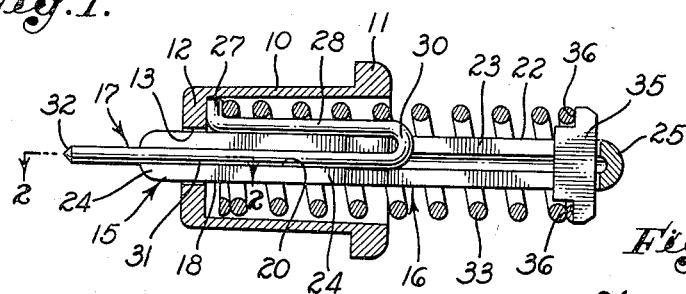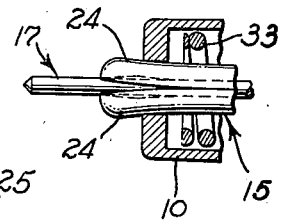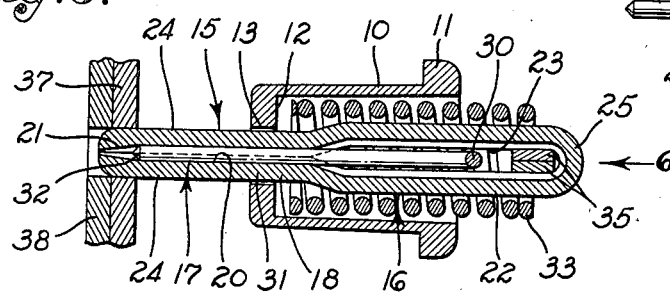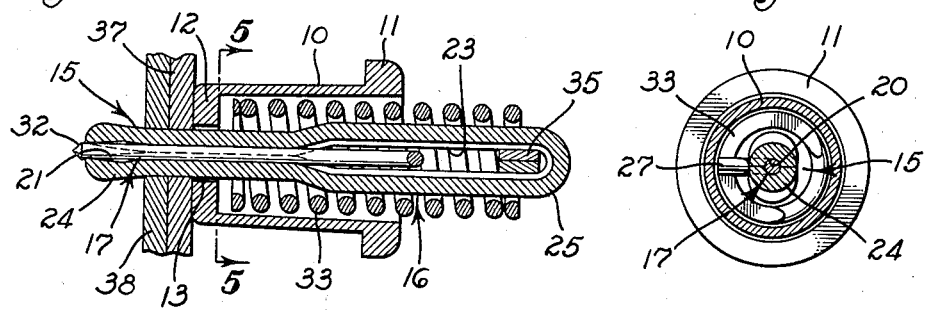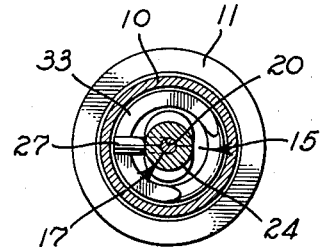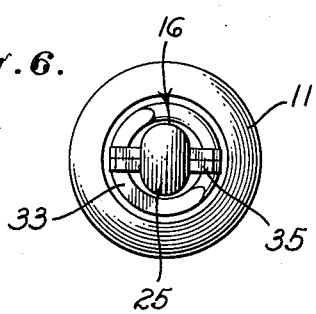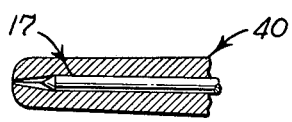

2,343,499

UNITED STATES PATENT OFFICE 2,343,499

TEMPORARY FASTENER

Russell W. Edwards, Arcadia, Calif.

Application February 23, 1943, Serial No. 476,818

3 Claims. (Cl. 85—5)

My invention relates to temporary fastening devices and in particular to such devices for holding together two or more sheet members for riveting operations. Such devices are commonly known as riveting clamps.

One object of my invention is to provide a simple and efficient fastening device of inexpensive construction.

It is a special object of the invention to provide a riveting clamp that will not be subject to the destructive forces that cause riveting clamps of prevalent types to be discarded as useless after short service periods. Prevalent types of clamps have enlargements or lateral projections on the end of the pin assembly that is inserted through rivet holes. Whenever one of the work sheets being riveted together shifts in the course of the riveting operation thereby slightly misaligning the rivet holes, the inserted portion of the riveting clamp can be withdrawn only by such severe wrenching and twisting as to damage the clamp permanently.

To avoid occurrence of these destructive forces, one specific object of my invention is to avoid the necessity for troublesome shoulders or lateral projections on the leading portion of the clamp. Another specific object in this regard is to provide a pin or plunger construction that serves as positive means to prevent restriction of the opening through the layers of sheet metal to less cross dimension than the portion of the clamp that must be withdrawn through the opening. In other words, the clamp is to serve as positive means to prevent such creepage of the work sheets as would seriously interfere with withdrawal of the clamp at the end of riveting operations.

A further cause for rivet clamps becoming useless is wear in the aperture or bore of the clamp body through which the pin or plunger assembly extends and retracts. Retraction is normally limited by the body bore stopping the expanded pin assembly, but the bore may become so enlarged by wear as to permit the pin assembly to retract completely and cause the whole clamp to fall apart. One of the objects of my invention is to provide a pin assembly that is not subject to this cause for failure, the pin assembly, in effect, compensating automatically for wear of the surrounding bore in the clamp body.

A still further object in mind is to provide a laterally or radially expansile pin assembly that will automatically adjust itself for engagement with rivet holes varying in diameter.

Other objects and advantages of my invention will be apparent in the following description, taken with the accompanying drawing.

In the drawing, which is to be considered as illustrative only:

Fig. 1 is a longitudinal sectional view of the clamp when out of service;

Fig. 2 is a fragmentary longitudinal view taken as indicated by the line 2—2 of Fig. 1;

Fig. 3 is a longitudinal sectional view of the clamp along the same plane as Fig. 2 showing the clamp extended for insertion into rivet holes;

Fig. 4 is a similar view of the clamp engaging two work sheets;

Fig. 5 is a transverse section taken as indicated by the line 5—5 of Fig. 4;

Fig. 6 is an end view of the clamp taken as indicated by the arrow 6 in Fig. 3; and Fig. 7 is a fragmentary longitudinal section indicating the construction of a modified form of the clamp.

The preferred form of my invention shown in the drawing includes a cylindric or cup-shaped body 10 having a rim flange 11 and a bottom wall 12 with an axial aperture 13. Projecting through the aperture 13 is what may be termed a plunger assembly or pin assembly generally designated 15 comprising a hollow plunger 16 and a spreader means 17.

The hollow plunger 16 has a forward cylindric portion 18 with an axial bore 20. The axial bore 20 may be a simple blind bore, but preferably has a tapered end to provide what may be termed inclined wedging surfaces 21. The rearward portion 22 of the hollow plunger 16 is enlarged in cross section and provided with a longitudinal slot 23 for entrance to the interior of the plunger.

At least the outer end of the hollow plunger 16 is split longitudinally into a plurality of longitudinal sections 24, which sections may be wedged apart for radial expansion of the nose of the plunger. I prefer to split the plunger throughout its major length. In the illustrated embodiment of my invention there are two such sections 24 with a diametrical plane of division. A feature of this particular embodiment is that I may, and by preference do, fabricate the hollow plunger by simply forming and folding a piece of metal in a suitable manner. Thus, the piece of material is folded on itself to form a loop 25 at the rear end of the plunger, this loop defining the aforementioned slot 23.

Any suitable spreader means may be employed for cooperation with the hollow plunger 16 to cause the nose of the plunger to expand radially in response to retraction of the plunger. In the present form of the invention, for example, I employ as the spreader means 17 a bent spreader pin having an outwardly turned end portion 27 to serve as a base, a portion 28 extending longitudinally adjacent the hollow plunger 16, a loop portion 30 extending laterally into the plunger through the slot 23, and, finally, an axial portion 31 at the second end of the pin. Preferably, the nose of the spreader pin 17 is tapered to provide what may be termed a wedge surface 32.

To urge the hollow plunger 16 toward the retracted position shown in Fig. 1, any suitable yielding means may be employed to act between the body 10 and the hollow plunger. In the present embodiment I use a simple coiled spring 33 that surrounds both the plunger 16 and the longitudinal portion 28 of the spreader pin. For cooperation with such a coiled spring the plunger 16 may be provided with a head or suitable transverse means. Thus, the drawing shows transverse means 35 in the form of two identical sheet metal stampings extending through the plunger slot 23, the two stampings being notched to form recesses 36 to seat the outer end of the coiled spring 33. The inner end of the coiled spring 33 presses the end portion 27 of the spreader pin 17 against the bottom wall 12 of the body 10. By virtue of this arrangement, the coiled spring 33 has the dual function of exerting yielding force on the hollow plunger 16 and of holding the spreader pin 17 against movement axially of the body 10.

It may be readily perceived that the described construction lends itself to mass production at relatively low cost. The body 10 may be either a metal casting or molded plastic. The hollow plunger 16 may be fabricated in large part, if not wholly, on a punch-press. The metal stampings constituting the transverse means 35 may be made from sheet metal scrap at insignificant cost. The spreader pin 17 may be manufactured in quantity by using well known automatic machinery. Finally, assembly of the completed clamp is a simple procedure of putting the various parts together by hand with no necessity for even threading operations.

The manner in which the improved riveting clamp operates may be readily understood from the foregoing description. When the riveting clamp is out of service, the outer end of the hollow plunger 16 is expanded to serve as a stop to prevent complete retraction of the hollow plunger through the body aperture 13, as indicated in Figs. 1 and 2.

While the spreadable longitudinal sections 24 of the hollow plunger may be relatively rigid in some practices of the invention, I prefer to fabricate the plunger from such flexible material that the nose of the plunger when retracted will "bulge" in the manner indicated in Fig. 2. It is apparent that any enlargement of the body aperture 13 caused by wear over a period of time will merely result in the normal position shown in Fig. 2 shifting slightly inward. Thus, the hollow plunger may be said to compensate automatically for wear of the body around the aperture 13.

In preparation for insertion through rivet holes a suitable clamp tool is engaged with the body flange 11 and the end of the plunger 16 to compress the coiled spring 33, thereby to cause full extension of the plunger 16 from the position shown in Figs. 1 and 2 to the extended position shown in Fig. 3. In the course of this movement of extension on the part of the plunger 16, the plunger is shifted beyond the outer end of the spreader pin 17 so that the inclined wedging surfaces 21 of the plunger escape from the wedging action of the spreader pin and then close together. The whole of the extended portion of the plunger then assumes a substantially cylindric configuration of substantially uniform diameter somewhat less than the diameter of rivet holes for which the clamp is designed. Fig. 3 shows the clamp being inserted in an opening formed by two rivet holes in metal work sheets 37 and 38.

The workman holds the body 10 of the clamp close to the sheets 37 and 38 and then permits the spring 33 to be gradually released. The spring 33 causes retraction of the hollow plunger 16 until the inclined wedging surfaces 21 of the hollow plunger slide over the end of the spreader pin 17, the end of the hollow plunger being thereby expanded into a diameter large enough to engage the surrounding material of at least the outer work sheet 38. Ultimately the plunger stops at the retracted position shown in Fig. 4 with the two work sheets 37 and 38 drawn tightly together and against the clamp body 10.

While the two sheets 37 and 38 are being held together by the clamp in the manner indicated in Fig. 4, creepage of one of the work sheets relative to the other may cause the sheet material to tightly embrace the hollow plunger 16. It is to be noted, however, that the hollow plunger together with the contained spreader pin 17 constitutes a solid cylindric mass of metal that precludes in a positive manner any restriction of the openings through the work sheets to a cross dimension less than the uniform diameter of the extended plunger in Fig. 3. It follows, then, that when a clamp tool is again applied to cause the plunger 16 to be extended for retraction from the work sheets after riveting operations, the extended plunger will readily withdraw through the opening in the two sheets, as shown in Fig. 3, and there will be no reason for the workman to use damaging force to free the clamp from the sheets.

It is apparent from Fig. 4 that the plunger 16 when expanded at its outer end will engage rivet holes varying from the precise size of rivet holes for which the clamp is designed. Thus, the clamp will have a "centering" action on rivet holes greatly oversized as well as rivet holes slightly undersized.

In some practices of the invention the hollow plunger may be slightly tapering or conical in configuration to assure withdrawal of the clamp from work sheets with utmost ease regardless of the tightness with which the hollow plunger is embraced by the work sheets. Thus Fig. 7 indicates the configuration of the extended portion of a tapering hollow plunger 40 that may be substituted for the above described hollow plunger 16.

The description of the preferred practice of my invention in detail will suggest to those skilled in the art various changes and substitutions under my basic concept, and I reserve the right to all such departures from my disclosure that lie within the scope of the appended claims.

I claim as my invention:

1. A device of the character described for use in rivet holes, comprising: a body having a wall with an aperture therein; a hollow plunger having a rearward longitudinal opening and a forward portion extending through said aperture, said plunger being spit longitudinally into sections at its outer end for radial expansion sufficient to prevent retraction of the plunger through said aperature; a spreader member having an end portion abutting the inner face of said wall, a portion longitudinally adjacent said plunger, a portion extending from said longitudinal portion through said longitudinal opening, and an end portion extending forward longitudinally within said plunger to spread said sections apart for radial expansion of the plunger in response to retraction of the plunger; and yielding means continuously urging said plunger toward retraction.

2. A device of the character described for use in rivet holes, comprising: a body having a wall with an aperture therein; a hollow plunger having a rearward longitudinal opening and a forward portion extending through said aperture, said plunger being split longitudinally into sections at its outer end for radial expansion sufficient to prevent retraction of the plunger through said aperture; a spreader member having an end portion abutting the inner face of said wall, a portion longitudinally adjacent said plunger, a portion extending from said longitudinal portion through said longitudinal opening, and an end portion extending forward longitudinally within said plunger to spread said sections apart for radial expansion of the plunger in response to retraction of the plunger; and a coiled spring surrounding said plunger and said adjacent portion of said spreader member, said spring being in compression between said plunger and said abutting end of the spreader member, whereby the spring serves both to urge said plunger toward retraction and to hold said abutting end of the spreader member against longitudinal movement.

3. A device of the character described for use in rivet holes, comprising: a body having a wall with an aperture therein; a hollow plunger having a rearward longitudinal opening and a forward portion extending through said aperture, said plunger being split longitudinally into sections at its outer end for radial expansion sufficient to prevent retraction of the plunger through said aperture; a spreader member having an end portion abutting the inner face of said wall, a portion longitudinally adjacent said plunger, a portion extending from said longitudinal portion through said longitudinal opening, and an end portion within said plunger to spread said sections apart for radial expansion of the plunger in response to retraction of the plunger; transverse means carried by said plunger; and a coiled spring surrounding said plunger and said longitudinally adjacent portion of said spreader member, said spring being in compression between said end wall and said transverse means.

RUSSELL W. EDWARDS.